United States Patent [19]
Collier

[11] Patent Number: 5,387,929
[45] Date of Patent: Feb. 7, 1995

[54] METHOD AND APPARATUS FOR SUBJECT IMAGE TRACKING IN HIGH DEFINITION FILM-TO-VIDEO COLOR CORRECTION

[75] Inventor: David C. Collier, Gilroy, Calif.

[73] Assignee: Sony Electronics, Park Ridge, N.J.

[21] Appl. No.: 979,170

[22] Filed: Nov. 20, 1992

[51] Int. Cl.$^6$ .............................................. H04N 9/11
[52] U.S. Cl. ..................................... 348/97; 348/104
[58] Field of Search ............... 358/54, 214, 500, 517, 358/518, 519, 520, 504, 139, 10; H04N 9/11, 3/36, 5/253; 348/96, 97, 104, 180

[56] References Cited

U.S. PATENT DOCUMENTS

| | | | |
|---|---|---|---|
| 3,853,564 | 12/1974 | Baker | 355/132 |
| 3,885,971 | 5/1975 | Kato | 359/893 |
| 4,290,692 | 9/1981 | Svatek | 355/69 |
| 5,053,866 | 10/1991 | Johnson | 358/518 |
| 5,057,931 | 10/1991 | Numakura et al. | 358/518 |
| 5,060,061 | 10/1991 | Shishido et al. | 358/214 |
| 5,081,529 | 1/1992 | Collete | 358/504 |
| 5,255,083 | 10/1993 | Capitant | 358/500 |

*Primary Examiner*—James J. Groody
*Assistant Examiner*—Chris Grant
*Attorney, Agent, or Firm*—Irell & Manella

[57] ABSTRACT

A subject image being electronically transferred from a first medium to a second medium is accomplished through tone scale tracking. Three monochromatic channels representing the subject image are generated from the first medium. In a preferred embodiment, an image processing system provides color correction for each channel by compensating for film and video characteristics that cause a degradation of color from the original subject image. Calibration of the system is provided by means for an operator to specify tone densities for the second medium that correlate to signal levels derived from the first medium for each channel. The image processing system tracks the tone densities calibrated to provide enhanced film masking. The image processing system also performs characteristic curve processing in accordance with a Hurter-Driffield (HD) curve. A characteristic curve interface is provided allowing an operator to place the subject image on the characteristic curve so that the image processing system tracks the location of the subject image on the curve.

39 Claims, 6 Drawing Sheets

METHOD AND APPARATUS FOR SUBJECT IMAGE TRACKING IN HIGH DEFINITION FILM-TO-VIDEO COLOR CORRECTION

BACKGROUND OF THE INVENTION

1. Related Applications

The present application is related to the following U.S. patent applications, assigned to the assignee of the present invention, Sony Corporation of America, Park Ridge, N.J.:

Ser. No. 07/741,329, filed on Aug. 7, 1991, entitled Non-Real-Time Film Scanning System;

Ser. No. 07/736,006, filed on Jul. 25, 1991, entitled Digital Video Processing System With Mixing Prefilter;

Ser. No. 07/746,928, filed on Aug. 19, 1991, entitled Method and Apparatus for Flare Correction;

Ser. No. 740,626, filed on Aug. 5, 1991, entitled Digitized Film Image Processing System With Bordered Split Screen Display;

Ser. No. 07/660,662, filed on Feb. 25, 1991, entitled Digital Signal Processing System Employing Icon Display;

Ser. No. 07/794,489, filed on Nov. 19, 1991, entitled Computerized Interactive Menu-Driven Video Signal Processing Apparatus and Method;

Ser. No. 07/710,704, filed on Jun. 5, 1991, entitled Digital Color Correction System and Method;

Ser. No. 07/740,623, filed on Aug. 5, 1991, entitled Digital Video Color Processor With Anti-Aliasing;

Ser. No. 07/687,962, filed on Apr. 19, 1991, entitled Digital Color Correction System Having Gross and Fine Adjustment Modes;

Ser. No. 07,846,675, filed on Mar. 5, 1992, entitled Correcting Digitized Signals To Achieve Specified Output Results For an Image Ser. No. 07/846,675, filed on Mar. 5, 1992 entitled Correcting Digitized Signals to Achieve Specified Output Results for an Image;

Ser. No. 07,846,675, filed on Mar. 5, 1992, entitled Digitized Signals to Achieve Specified Output Results For An Image; and Ser. No. 07,854,367, filed on Mar. 19, 1992, entitled Hardware Implementation of HDTV Color Corrector.

2. Field of the Invention

The present invention relates to the field of image processing systems, and more particularly, to tracking a subject image for tone scale reproduction when electrically converting a subject image from a first medium to a second medium.

3. Art Background

In image processing, image signals typically undergo various adjustments or corrections. For example, in film to video conversion for high definition television (HDTV), these adjustments and corrections include:

a) correction of colorimetric distortions due to film dye cross-talk, b) correction of the non-linear luminance transfer function of the film, c) correction for distortion due to video cross-talk, d) conversion of linear data into a SMPTE 240M representation.

Additionally, in the exemplary film to video conversion for high definition television (HDTV) application, an operator may want to:

a) adjust the color of a film derived image to match that of a video derived image for seamless inter-cuts, b) removed localized noise, or c) process layered film mattes from different film types for smooth composition.

In film to video conversion, the film is illuminated so as to produce an optical image. The optical image is then projected onto an image sensing device to generate an HDTV video signal. The HDTV video signal generated in the scanning process is dependent upon a number of factors related to the set-up of the film scanning. These factors include: adjusting the light incident on the film to create the optical image; changing the light path filters; and setting an F-stop. As these adjustments are made, the film densities as represented in the HDTV video signal generated by the film scanning process also change. Although the HDTV video signal varies dependently with these adjustments, the image processing system must be calibrated to the film scanning process such that the film densities on the film being scanned correlate to a known signal level input in the image processing system. To account for these adjustments in the film scanning process, the image processing system may provide gain and bias controls for adjusting the HDTV video signal. However, because factors in set-up of the film scanning process may be unknown to the image processing system, absolute calibration through use of gain and bias controls becomes difficult. Therefore, it is an objective of the present invention to provide an image processing system calibrated to the film scanning process.

In addition to the initial calibration, the image processing system needs to account for other factors relating to the original exposure of the film. For example, cinematographers, when recording the initial subject image on the film, may use the dynamic range of the film, for artistic purposes, in ways unknown to the image processing system. For example, a film may be exposed such that the shadows of the image begin at a point greater than the standard 0.1 density units above base plus fog. Therefore, it is another objective of the present invention to provide a means for an operator to specify which portion of the film dynamic range was used to record the subject image. Finally, the relationship between the original exposure of the film and the HDTV dynamic range is not fixed. Therefore, it is a third objective of the present invention to provide a means for placing a corrected HDTV video signal into the dynamic range of the HDTV video monitor.

As will be disclosed, the present invention provides for a method and apparatus for tracking a subject image range through the image processing subsystems such that the tone scale may be more accurately reproduced.

SUMMARY OF THE INVENTION

A method and apparatus for tracking the tone scale of a subject image which is being electronically transformed from a first medium to a second medium is disclosed. In the preferred embodiment, a subject image is recorded onto polychromatic film, and is subsequently converted to a high definition video signal. A film scanner optically scans the subject image on the film, and the film scanner separates the subject image into its three monochromatic optical film images. The monochromatic optical film images are digitized and input to an image signal processing subsystem. The image signal processing subsystem provides color correction for the three monochromatic channels. In performing color correction, the image signal processing subsystem compensates for film and video characteristics that cause a degradation of color from the original subject image.

Before performing color correction on each channel, calibration of the image processing subsystem to the film scanner occurs. To calibrate the image processing subsystem, an operator specifies white and black levels corresponding to highlight and shadow tones respectively. Through use of an image range interface, an operator specifies, for each channel, a first signal level to correspond to the white tone level and a second signal level to correspond to the black tone level. In this way, an operator may specify any range of tones, within the input signal range, to represent the white and black tone densities recorded on the film to correlate to tone densities on an output HDTV monitor.

The image signal processing subsystem also performs characteristic curve processing for each channel in accordance with a Hurter-Driffield (HD) characteristic curve. The HD characteristic curve depicts the relationship between the film dye density and a logarithm of the relative film exposure. The HD characteristic curve is derived from characteristic curve parameters which are dependent upon the type of film being scanned. A characteristic curve interface is provided in the operator interface which allows an operator to enter and adjust both a base black exposure and a contrast range for the subject image. With the characteristic curve interface, the user may place the subject image on any portion of the relative film exposure axis of the HD characteristic curve. In this way, more accurate corrections for film characteristics are provided because the location of the subject image on the characteristic curve is known. The present invention tracks the white and black levels specified in calibration such that the white and black levels are mapped exactly onto the relative exposure axis of the HD characteristic curve for each channel.

Upon completion of the characteristic curve processing, the subject image is placed in a video signal range of the output HDTV monitor. To accomplish this, the green monochromatic channel can be selected as a reference channel. By default or through an output range control, an output white level can be specified for the reference channel so that the output reference white level is set equal to the input reference white level set during calibration. Similarly, an output reference black level can be specified by default or through an output range control so that the output reference black level is set equal to the input reference black level set during calibration. The non reference, e.g. red and blue, monochromatic channels now float in the output HDTV signal range relative to their relationship to the reference, e.g. green, channel.

DETAILED DESCRIPTION OF THE INVENTION

A method and apparatus for tracking a subject image when transforming the subject image from a first medium to a second medium is disclosed. In the following description, for purposes of explanation, specific nomenclature is set forth to provide a thorough understanding of the present invention. However, it will be apparent to one skilled in the art that these specific details are not required in order to practice the present invention. In other instances, well known circuits and devices are shown in block diagram form in order not to obscure the present invention unnecessarily.

Figure 1:
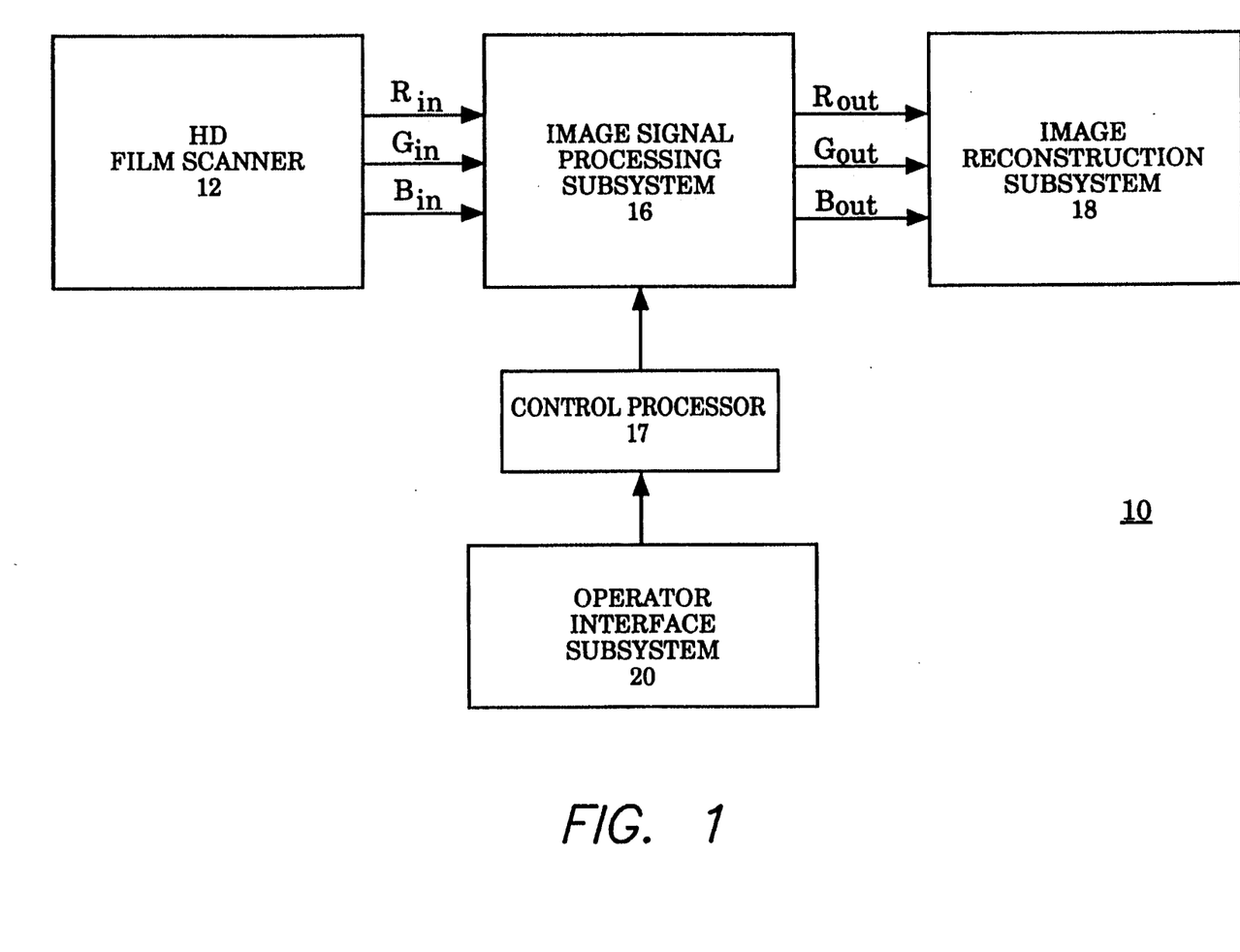
FIG. 1 is an overall block diagram of an image processing system that incorporates the teachings of the present invention.

Referring to FIG. 1, a block diagram illustrating a digital image processing system 10 that incorporates the teachings of the present invention is illustrated. A subject image, or a plurality of subject images, are recorded on a first medium. In the preferred embodiment, the first medium is motion picture film. The subject images are then electronically transferred from the first medium to a second medium. In the preferred embodiment, the second medium is high definition (HD) video. Although the present invention is described in conjunction with electronic transfer of a subject image from motion picture film to HD video, one will appreciate that electronic conversion of a subject image recorded on any first medium to any second medium could be accomplished under the teachings of the present invention. In the present invention, in order to electronically transfer the subject image from film to HD video, the film is placed in high definition (HD) film scanner 12.

High definition (HD) film scanner 12 comprises a light source, coupled to a colored filter wheel, that projects light, through the colored filter wheel upon the film located in the scanner. The color wheel spins and the filtered light source illuminates the film so as to generate a polychromatic optical film image of the subject image. The optical image is then collimated through a lens configuration and illuminated onto a charged coupled device (CCD) image sensor array. In the preferred embodiment, the CCD image sensor is a high definition (HD) CCD image sensor comprising an array of 1920×1035 photo sensitive elements. The HD CCD image sensor separates the subject image into its constituent monochromatic optical film images. In the preferred embodiment, the subject image is separated into red, green and blue images. However, other complementary color combinations can be used, such as the color trio of cyan, magenta and yellow, with equal effectiveness. Alternatively, a luminance-chrominance signal trio comprising of a luminance signal (Y), a red chrominance signal (Pr) and a blue chrominance signal (Pb) could be used.

The HD CCD image sensor, along with the associated circuitry, generates the three monochromatic optical film images in the form of an analog high definition video signal. The analog high definition video signals are input to an analog to digital (A/D) converter. From the three analog high definition video signals generated by the CCD image sensors, the A/D converter generates digitized samples of the subject image. The A/D converter subsystem is intended to represent a broad category of analog to digital conversion devices which are well known in the art and will not be described further. For a detailed discussion concerning film scanners such as HD film scanner 12 of the present invention, see "Non-Real-Time Film Scanning System", filed by Capitant et al. on Aug. 7, 1991 and under Ser. No. 07/741,329 and "Film Scanning Apparatus and Method", filed by Gait et al. on Mar. 29, 1991 under Ser. No. 07/677,578 both assigned to the assignee of the present invention, Sony Corporation of America, Park Ridge, N.J.

High definition film scanner 12 outputs the three digitized monochromatic channels red ($R_{in}$), green ($G_{in}$) and blue ($B_{in}$) to an image signal processing subsystem 16. The image signal processing subsystem 16 takes the outputs of the high definition film scanner 12 inputs and in turn outputs to the image reconstruction subsystem 18. The image signal processing subsystem 16 performs transforms, including signal adjustments and corrections, on the three digitized monochromatic channels $R_{in}$, $G_{in}$ and $B_{in}$. The image signal processing subsystem 16 will be described in further detail later with reference to FIGS. 2a and 2b. The image reconstruction subsystem 18 takes the outputs of the image signal processing subsystem 16 as inputs, and in turn displays the images. The image reconstruction subsystem 18 is also intended to represent a broad category of image reconstructors, including raster displays and HDTV monitors which are also well known in the art and will not be described further.

The image signal processing subsystem 16 interacts with the operator through the operator interface subsystem 20. Through the operator interface subsystem 20, an operator provides various commands and input parameters to image signal processing subsystem 16. The operator interface subsystem 20 will be described in further detail later with reference to FIGS. 3 and 4. Particular examples of image processing systems that can incorporate the teachings of the present invention are the film to video conversion image processing systems described in the related applications, Ser. No. 07/741-329 entitled Non-Real-Time Film Scanning System; Ser. No. 07/736,006 entitled Digital Video Processing System With Mixing Prefilter; Ser. No. 07/746,928 entitled Method and Apparatus for Flare Correction; and Ser. No. 07/740-626 entitled Digitized Film Image Processing System With Bordered Split Screen Display.

Figure 2A:
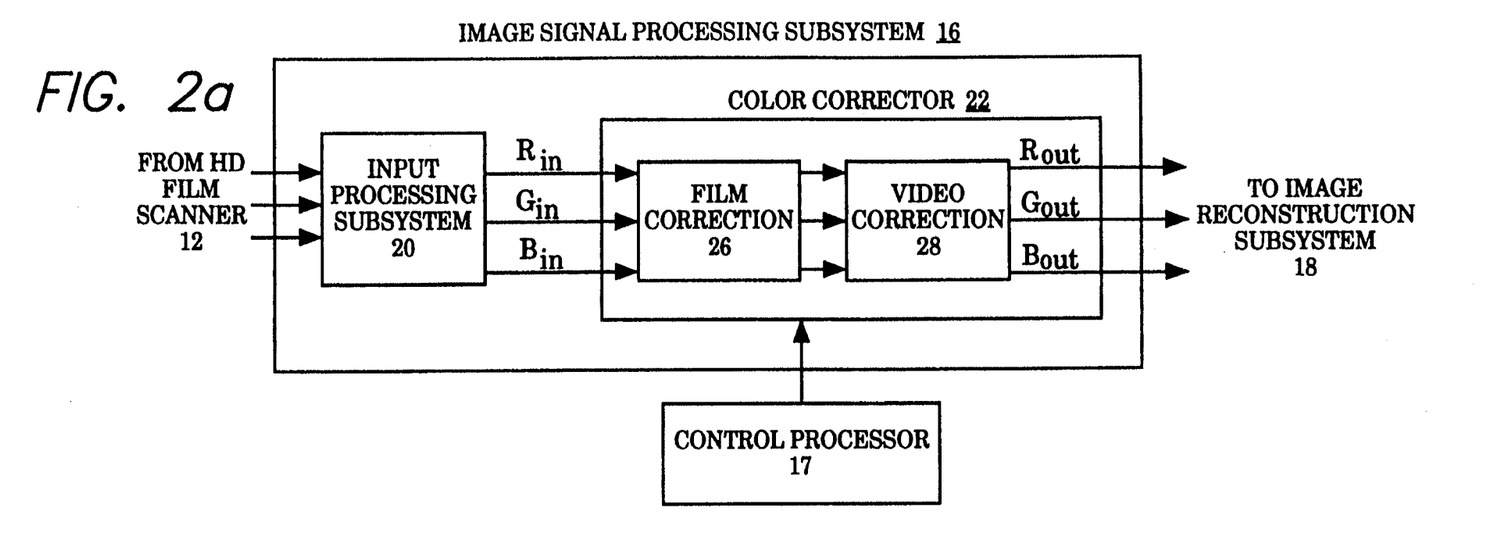
FIG. 2a is a block diagram illustrating an image signal processing subsystem of the present invention.

Referring to FIG. 2a, a block diagram illustrating the image signal processing subsystem 16 of the image processing system 10 is shown. Input processing subsystem 20 receives the three digitized monochromatic channels $R_{in}$, $G_{in}$ and $B_{in}$ from the A/D converter of HD film scanner 12. Input processing subsystem 20 performs preliminary corrections on the monochromatic channel digitized signals before supplying the digitized signals to color corrector 22. An example of such preliminary color corrections is a noise reduction process for eliminating or reducing localized noise. The input processing subsystem 20 is intended to represent a broad category of analog to digital input signal processors whose functions and constitutions are well known and will not be described further.

The color corrector 22 takes the digitized outputs of the input processing subsystem 20 as inputs and in turn outputs to the image reconstruction subsystem 18. The color corrector 22 performs the functions of color correction. In general, the color corrector involves correcting for film characteristics and video signal characteristics. In correcting for the film characteristics, color corrector subsystem 22 considers crosstalk between the dyes in the multiple emulsion layers of color film, film speed, gamma, minimum and maximum film dye densities and shadow and highlight compression. Correction for these film characteristics is often difficult because these film characteristics are generally non-linear. In addition to the film characteristics, color corrector 22 also compensates for video signal characteristics. Video signal characteristics include electronic channel cross talk and non-linear responses. Furthermore, a video signal must also be converted by an encoder (not shown) to an output format for a monitor or display, such as encoded format SMPTE 240M.

The color corrector 22 performs various transforms including signal adjustments and corrections. In particular, the color corrector 22 comprises a film correction unit 26 and a video correction unit 28. Film correction subsystem 22 converts the three monochromatic channels $R_{in}$, $G_{in}$ and $B_{in}$ to their respective logarithmic equivalents by use of a film logarithm look-up table (LUT). Film correction subsystem 26 also performs film masking matrix processing to compensate in each monochromatic channel for crosstalk among polychromatic color emulsions of the original film stock. In addition, film correction subsystem 26 performs characteristic curve processing for each channel in accordance with a Hurter-Driffield (HD) characteristic curve. The HD characteristic curve depicts the relationship between the film dye density and a logarithm of the relative film exposure as will be more fully explained below.

In order to effectively reproduce a subject image recorded on a first medium to a second medium, the transferring system must be calibrated such that tone levels from the first medium correlate to the appropriate tone levels in the second medium. In this way, the tone scale recorded on the first medium correlates to the tone scale reproduced upon the second medium. For film to HD video conversion, the color corrector 22 must be calibrated such that a tone density on the film correlates with a tone density on the HD video signal. In addition to accurately reproducing the original tone scale recorded on the film, additional set-up and calibration procedures are required. First, image light incident upon each CCD image sensor within HD film scanner 12 must be within the limitations of the CCD range. The image light incident upon the CCD image sensors must utilize the full dynamic range of the CCD imagers, and the desired optical image generated by the incident light must coincide with the CCD range. In addition, the light intensities for the three monochromatic channels are balanced, and the subject image is focused. Furthermore, the effects of flare and shading must be minimized. For a detailed discussion concerning reduction of flare see U.S. patent application Ser. No. 07/746-928 filed on Aug. 19, 1991, entitled Method and Apparatus for Flare Correction.

Figure 3:
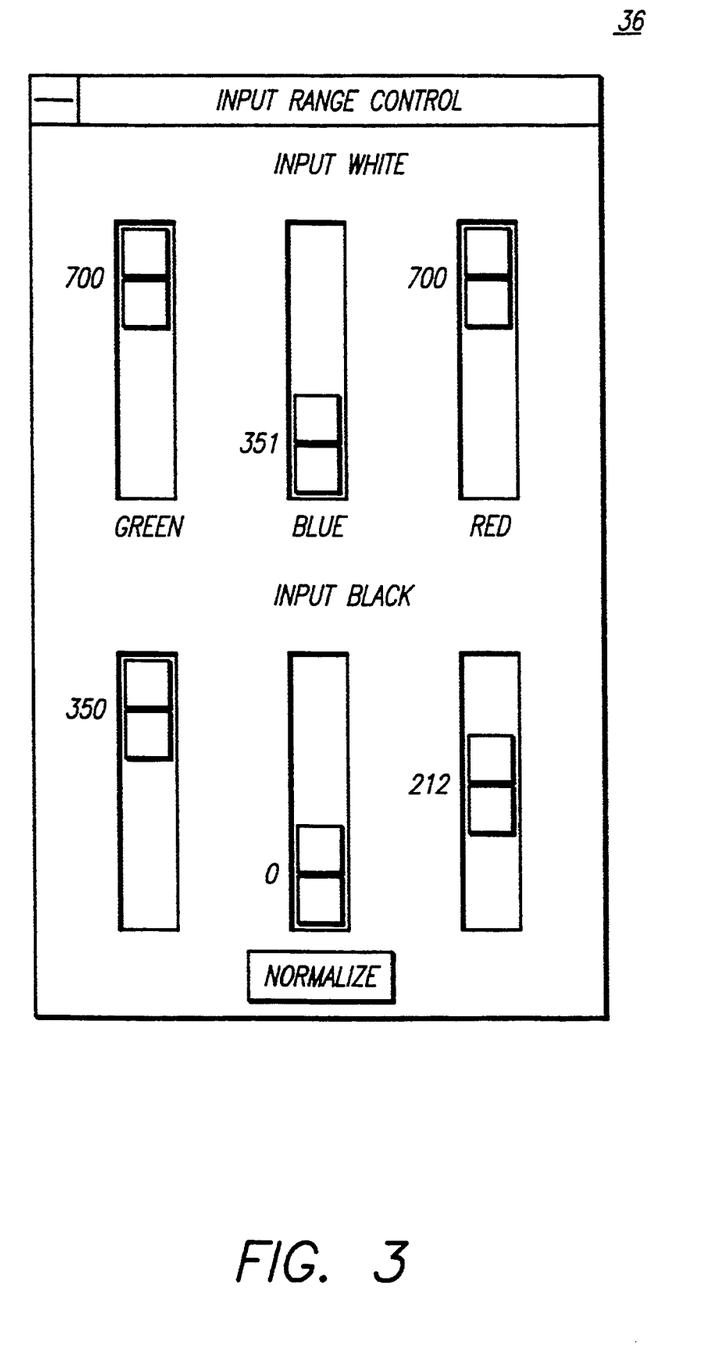
FIG. 3 is an illustration of an input range control interface of the present invention.

Referring to FIG. 3, an image calibration interface incorporating the teachings of the present invention is illustrated. Input range control 36 is contained within operator interface subsystem 20. Input range control 36 specifies relative tone densities for the inputs to color corrector 22 for the three monochromatic channels. For each monochromatic channel, there is an input white and an input black range control slider as illustrated in FIG. 3. For each monochromatic channel generated in HD film scanner 12, a user specifies to color corrector 22 a first signal amplitude through use of the input white control slider representing a white level for the subject image. In addition, for each monochromatic channel, the user also specifies a second signal amplitude through use of the input black control slider which represents a black level for the subject image.

The scales for each monochromatic channel on input range control 36 are given in millivolts (mV). In the preferred embodiment, an input buffer waveform monitor is coupled to $R_{in}$, $G_{in}$ and $B_{in}$ such that a user can calibrate the voltage level output from HD film scanner 12 for the white and black density levels. For example, to specify the input range of the white level for the green channel, the user, by viewing tones on a video monitor, selects a tone in which the user wishes to define as the white density level for the green channel. The user then reads the voltage level from the input buffer waveform monitor to ascertain the corresponding voltage level for the white density level. In a similar manner, the user selects a tone to correspond to the black density level for the green channel. In this way, image calibration is a relative process such that a user can specify any tone range, as long as the range falls within the output range of the CCD, for each monochromatic channel by setting both the input white slider and the input black slider. When no input range is specified from input range control 36, color corrector 22 sets the default range to the ends of the CCD range. In the preferred embodiment, the output range of each CCD image sensor is 0 to 700 mV.

Figure 2B:
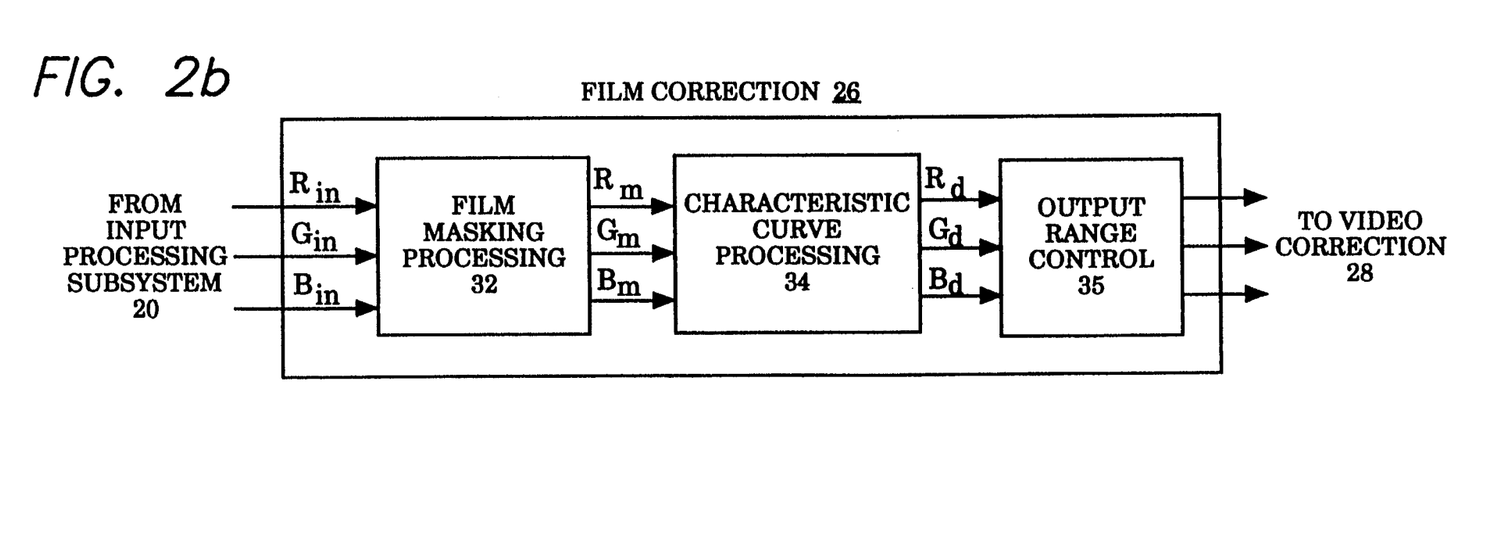
FIG. 2b is a block diagram illustrating a film correction subsystem of the present invention.

Referring to FIG. 2b, a block diagram of color corrector 22 incorporating the teachings of the present invention is illustrated. $R_{in}$, $G_{in}$ and $B_{in}$ are input to film masking matrix processing subsystem 32. Film masking matrix processing subsystem 32 comprises three logarithmic converters for each monochromatic channel. The logarithmic converters convert $R_{in}$, $G_{in}$ and $B_{in}$ to their respective logarithmic equivalents by use of a film logarithm look-up table (LUT). The film logarithm look-up table provides a value in the logarithm domain through use of the monochromatic channel inputs $R_{in}$, $G_{in}$ and $B_{in}$ as an index to the LUT. A further discussion of the film logarithm LUT, as applied to subject image tracking of the present invention, follows below. The logarithmic conversions for each channel are input to a film masking matrix processor, and are colored masked in accordance with a film masking matrix. The film masking matrix comprises of nine matrix terms. The film masking matrix processor compensates or corrects the input logarithmic converted monochromatic channels for cross talk effects within the film color signals due to crosstalk among the red, green and blue emulsions of the original film stock. For a detailed description of the film masking matrix and generation of the nine film masking matrix terms, see U.S. patent application Ser. No. 07/710,704, filed on Jun. 5, 1991, entitled Digital Color Correction System and Method.

The output color masked signals $R_m$, $G_m$ and $B_m$ are input into the characteristic curve processing subsystem 34 as illustrated in FIG. 2b. Characteristic curve processing subsystem 34 comprises of three pairs of sensitometric converters and antilogarithm converters, one pair for each monochromatic channel. The sensitometric converter of characteristic curve processing subsystem 34 sensitometrically converts the color masked film signals $R_m$, $G_m$ and $B_m$ substantially in accordance with a Hurter-Driffield (HD) characteristic curve for each monochromatic channel. The HD characteristic curve depicts the relationship between the film dye density and the logarithm of the relative film dye exposure. Characteristic curve processing subsystem 34 uses the HD curve relationship to correct for inconsistencies between the tone scale of the original subject image and the tone scale of the subject image as recorded on the film.

The sensitometric conversion performed by characteristic curve subsystem 34 is done in accordance with film color correction parameters. The film color correction parameters are dependent upon the film characteristics of the film being scanned. The parameters, which describe the overall shape of the HD characteristic curve, include the maximum and minimum dye density (i.e. base plus fog), the toe and shoulder curvature, gamma (i.e. the slope of the straight line portion of the curve), and the film ASA speed. Because these parameters are based on the particular film type used in recording the original subject image, the parameters are different for each type of film. A subject image black level and a subject image contrast range are additional parameters that describe how the particular film was exposed. The subject image black level and the subject image contrast range are described more fully below.

Each sensitometric converter contained in characteristic curve processing subsystem 34 comprises a look-up table (LUT) and associated hardware for implementing the corrections. For a detailed description of a hardware implementation in accordance with the present invention see U.S. patent application Ser. No. 07/854,367 filed on Mar. 19, 1992, entitled Hardware Implementation of HDTV Color Corrector. The characteristic curve parameters, entered into the system from operator interface subsystem 20, are used as a basis for control processor 17 to automatically generate entries for the LUT contained in characteristic curve processing subsystem 34. For a detailed description of generation of entries for the LUT in characteristic curve processing subsystem 34 see U.S. patent application Ser. No. 07/846,675, filed on Mar. 5, 1992, entitled Correcting Digitized Signals to Achieve Specified Output Results For An Image.

Figure 4A:
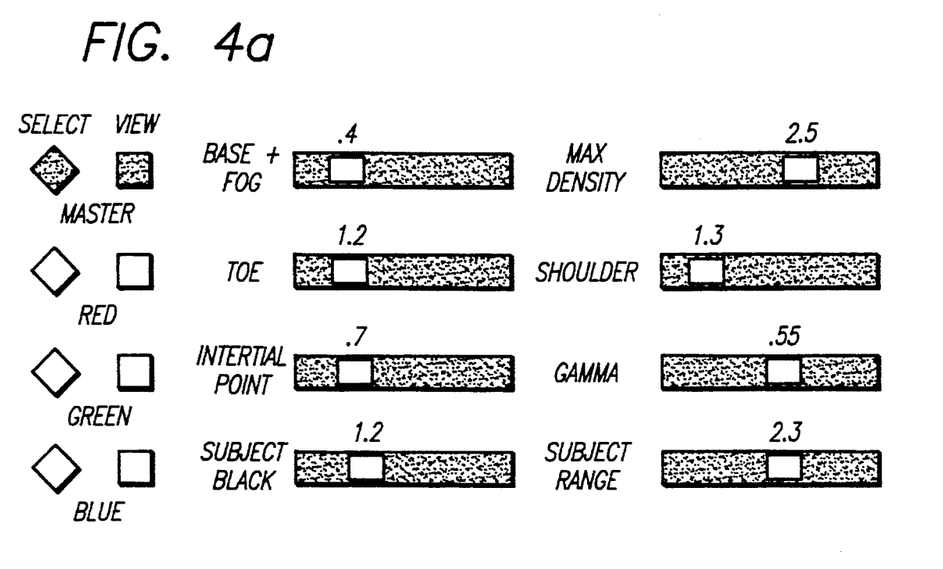
FIGS. 4a and 4b are illustrations of a characteristic curve interface of the present invention.
Figure 4B:
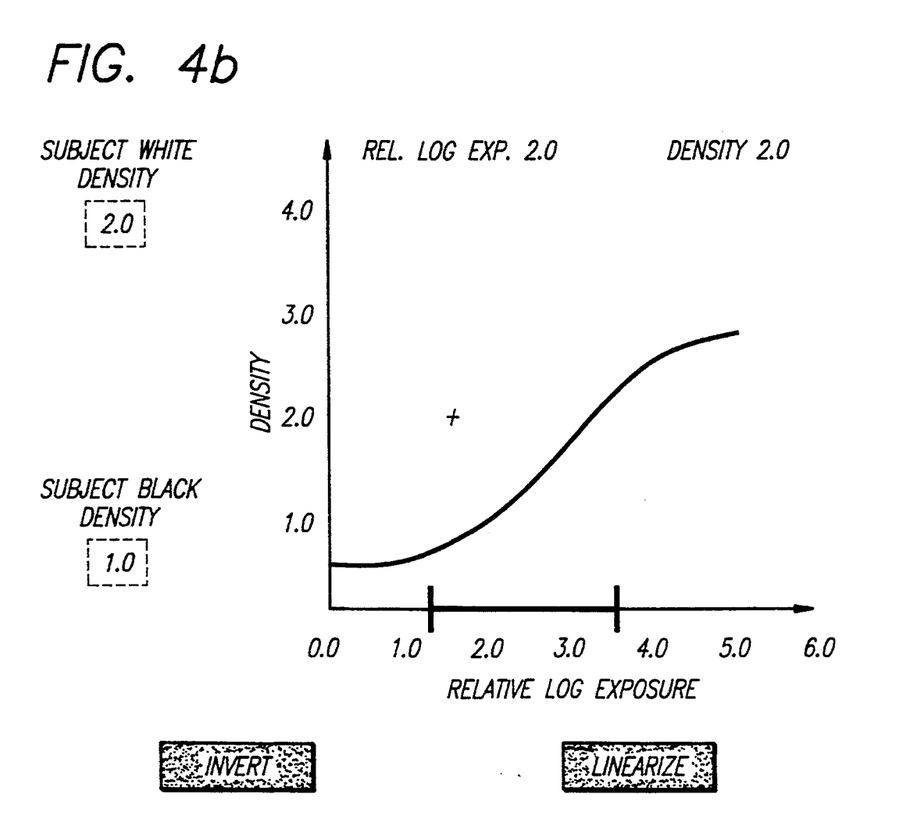

Referring to FIG. 4b, a characteristic curve for a negative film type is illustrated. The vertical axis is the film dye density and the horizontal axis is the logarithm of the relative exposure. For purposes of explanation, the characteristic curve may be divided into three regions. First, a linear region, located in the center of the HD characteristic curve, where the relationship between film dye density and relative log exposure is approximately linear. The slope of this curve in the linear region is defined by gamma. As shown in FIG. 4b, gamma has a positive slope for the negative film type used in recording the subject image. A second region, located at the top portion of the curve, is defined as the shoulder, and the relationship between film dye density and relative log exposure is no longer linear. A third region, located at the bottom portion of the curve, is defined as the toe which also defines a non-linear relationship between film dye density and relative log exposure. For a detailed description of characteristic curve parameters, see U.S. patent application Ser. No. 07/710,704, filed on Jun. 5, 1991, entitled Digital Color Correction System and Method.

Referring to FIG. 4, a film characteristic curve interface for the present invention is illustrated. The film characteristic curve interface is contained within the operator interface subsystem 20. In FIG. 4a, a plurality of slide controls are illustrated for the characteristic curve interface. Values for gamma, inertial point, fog plus base level, maximum density, toe and shoulder curvature, subject black and subject range are displayed for the selected curve (e.g. master). In FIG. 4b, a HD curve for modeling film transfer characteristics showing film dye density versus relative log exposure is illustrated for a selected channel.

The subject black level parameter is selected by a user through the use of the subject black slider on the characteristic curve interface. On the relative log exposure axis, the subject black level is indicated by a bold face short vertical line extending furthest to the left in FIG. 4b. In FIG. 4b, the subject black level is set at 1.2. The bold face indicator on the relative log exposure axis in FIG. 4b indicates the subject range. The subject range is adjustable by a user through the subject range slider on the characteristic curve interface. In FIG. 4b, the subject range is set at 2.3, and therefore, the bold face indicator starts at the subject black level of 1.2 and continues through the subject range of 2.3 to a log exposure subject white level of 3.5.

The invert control, located on the bottom of FIG. 4b, controls the sign of gamma while holding all of the other characteristic curve parameters unchanged. A sign change may signify the difference from a negative to a positive film type, or vice versa. The linearize control sets the characteristic control parameters to achieve a straight line with a slope of 1 or −1 depending upon the film type. The linearize control provides a pass through or identity transform for positive film types. For negative film types, a signal reversal occurs without further transformation. For further information on a film characteristic curve interface configured in accordance with the present invention see U.S. patent application Ser. No. 07/794,489, filed on Nov. 19, 1991, entitled Computerized Interactive Menu-Driven Video Signal Processing Apparatus and Method.

The subject image black and the subject image range controls provide a user the ability to select the placement of the subject image anywhere on the three film characteristic curves. In this way, if the user places the subject image on the linear portion of the curve, then only the characteristic curve parameter gamma need be applied to input signals $R_m$, $G_m$ and $B_m$. Alternatively, if the user places the subject image in or partially in the toe region of the curve, then a stretching of the black densities occurs in the density or log domain. Similarly, if the user places the subject image into or partially into the shoulder area of the curve, then stretching of the white densities occurs in the density or log domain. By allowing the user to place the subject image on the appropriate area of the films characteristic curves for each of the monochromatic channels, the appropriate amount of reconstruction or compensation for the subject image is applied in characteristic curve processing subsystem 34.

As shown in FIG. 4b, the subject image densities white and black are displayed to aid a user in placement of the subject image on the characteristic curve. For example, the user may have knowledge that a cinematographer exposed a subject image on the film such that the shadows of the subject image began at 0.1 density units above base+fog. With this knowledge, the user may set the subject image position on the relative log exposure axis with the subject black control at a point beginning at 0.1 density units above base+fog. The subject range is defined as the white level minus the black level on the relative log exposure axis. As discussed above, the user has the ability to place the subject image anywhere on the characteristic curve. However, even if the subject image is placed entirely on the linear portion of the characteristic curve, the overall throughput function is dependent upon the value of the subject range.

As discussed above, the subject image input range is specified by the input range control 36 on initial calibration of HD film scanner 12 with color corrector 22. The specified subject image input range is then tracked through color corrector 22. Specifically, the subject image input range is used to map the input signals $R_{in}$, $G_{in}$ and $B_{in}$ to the logarithmic domain via generating the film logarithmic LUT values. The tracking of the subject image input range into $R_{in}$, $G_{in}$ and $B_{in}$ into the logarithmic domain insures that the subject image white and black levels for each monochromatic channel lie on the appropriate portion of the respective HD film characteristic curve. To achieve the appropriate placement of the subject image on the log exposure axis of the HD characteristic curve for each channel, the black and white levels, as specified in the film characteristic curve interface, are back tracked through color corrector 22, are represented by the following mathematical relationships. Let, $B[x]$, for x=red, green, blue channels, and $W[x]$, for x=red, green, blue channels, represent the subject image black and white levels for each monochromatic channel found on the horizontal relative log exposure axis of the HD characteristic curve. Also define, $BD[x]$, for x=red, green, blue channels $WD[x]$, for x=red, green, blue channels as the black and white densities that map onto the defined black and white log exposures $B[x]$ and $W[x]$ through an HD characteristic curve such as the HD characteristic curve of FIG. 4b.

The characteristic curve actually implemented in the signal transformation process of characteristic curve processing subsystem 34 has the sign of the film gamma negated from both the characteristic curve interface, as displayed in FIG. 4b, and a film specification sheet. The inverse film gamma relationship is due to the relationship between the amount of light transmitted through the film in HD film scanner 12 and the film dye densities. To account for the inverse gamma relationship, the calculations invert the black and white densities such that, $BD^I[x] = (D_{max}[x] - D_{min}[x] - BD[x])$ for x=red, green and blue channels, and $WD^I[x] = (D_{max}[x] - D_{min}[x] - WD[x])$ for x=red, green and blue channels, where $BD^I[x]$ and $WD^I[x]$ represent the black and white densities transformed for the inverse gamma relationship, and $D_{max}[x]$ and $D_{min}[x]$ are the maximum and minimum dye densities for each of the three film color layers.

As described above, film masking processing 32 is accomplished in accordance with a linear matrix equation. The relationship between the transformed black and white densities $BD'[x]$ and $WD'[x]$ through the linear matrix equation is defined by:

$$BD' = \begin{bmatrix} BD'[\text{Red}] \\ BD'[\text{Green}] \\ BD'[\text{Blue}] \end{bmatrix} = (\text{Film Masking Matrix}) \times$$

$$\begin{bmatrix} \overline{BD[\text{Red}]} \\ \overline{BD[\text{Green}]} \\ \overline{BD[\text{Blue}]} \end{bmatrix} = (\text{Film Masking Matrix}) \times \overline{BD}$$

This linear matrix equation is solved for both color vectors $\overline{BD}[x]$ (vector) and $\overline{WD}[x]$ (vector). Also, let $$B'[x] = 10^{\overline{BD}[x]}$$

and $$W'[x] = 10^{\overline{WD}[x]}$$

for x=red, green and blue channels. The color vectors are used in deriving the targeted look-up tables for the film logarithmic conversion.

Define:
IB[x] for x=red, green and blue channels, and
IW[x] for x=red, green and blue channels
to represent the input black and white levels entered from input range control 36 for each monochromatic channel. To track the input range IB[x] and IW[x], IB[x] and IW[x] are linearly mapped in to B'[x] and W'[x]. Therefore, the desired film logarithms LUT values are generated by mapping IB[x] and IW[x] onto B'[x] and W'[x]. The logarithm base 10 is taken on B'[x] and W'[x] to obtain the color vector $\overline{BD}[x]$ (vector) and $\overline{WD}[x]$ (vector) respectively. Preferably, the film logarithm LUT values are combined with the film masking matrix terms to yield nine film masking matrix look-up tables. The combining of the film logarithm LUTs with the film masking matrix LUTs both places the input subject image into the appropriate portion of the log domain axis on the HD characteristic curve and incorporates the color-on-color masking contributions from the other channels.

Based on the initial specification of the subject image white and black levels in input range control 36, the subject image input range is tracked through the film corrections applied in film correction subsystem 26. In this way, the subject image input range is tracked during film corrections, from the monochromatic channel inputs $R_{in}$, $G_{in}$ and $B_{in}$, through film masking and characteristic curve processing including transformation of the subject image back into the linear domain. The generation of the LUT values for signal correction in characteristic curve processing subsystem 34 follows.

As defined above, define the black and white densities, inverted around the maximum and minimum densities, by the following equations:

$$BD'[x] = (D_{max}[x] - D_{min}[x] - BD[x]) \text{ for } x = \text{red, green and blue channels}$$

$$WD'[x] = (D_{max}[x] - D_{min}[x] - WD[x]) \text{ for } x = \text{red, green and blue channels}$$

In generating the logarithmic LUT values, the input range white and black levels, defined by IW[x] and IB[x] respectively, are first mapped into WD[x] (vector) and BD[x] (vector), and then into BD'[x] and WD'[x] as described above. In addition, tracking of the subject image input range is preserved in the generation of the characteristic curve LUT values as depicted by the following mathematical relationships.

Let D represent the input density to the characteristic curve LUT, and E(D) represent the characteristic curve output. The subject image tracking, performed by mapping D into E(D) is represented by the relationship:

$$\text{Log}E = \text{Log}E0 + n * (D_{max} - D) +$$

$$n * \text{Log}\left[\frac{1 - 10^{-\alpha*(D_{max}-D)}}{1 - 10^{-\beta*(D-D_{min})}}\right]$$

and $$E(D) = \text{Mult} * 10^{\text{Log}E} + \text{Bias}$$

where Mult is a multiplicative constant, and Bias is an additive constant. The multiplicative and additive constants are the same for all three monochromatic channels and are determined from a reference, e.g. green, band. When implementing the mapping for negative film (i.e. gamma is greater then zero), the multiplicative and additive constants are determined from the reference, e.g. green, band according to the following equations:

$$\text{Mult} = \left(\frac{IB - IW}{10^W - 10^B}\right)$$

$$\text{Bias} = (I_{max} - IB) - \text{Mult} * 10^B$$

wherein $I_{max}$ is the maximum of the input range. When implementing the mapping for negative film (i.e. gamma is less than zero), the multiplicative and additive constants are determined from the reference, e.g. green, band according to the following equations:

$$\text{Mult} = \left(\frac{IW - IB}{10^W - 10^B}\right)$$

$$\text{Bias} = IB - \text{Mult} * 10^B$$

Referring to FIG. 2b, the outputs of characteristic curve processing subsystem 34, $R_d$, $G_d$ and $B_d$ are input to output range control 35. $R_d$, $G_d$ and $B_d$ are signals representing the film exposures of the subject image from the original film corrected by characteristic curve processing subsystem 34. Output range control 35 provides the means, through output range control 38, for an operator to specify the black-to-white subject image of the three monochromatic channels on a video signal range of image reconstruction subsystem 18. Often, when interfacing a video signal to a video monitor, the subject image input black and white levels of a reference channel are specified so as to generate a fixed relationship to the output video display. Where such a reference channel is used, the other channels are adjusted relative to the channel reference. In a preferred embodiment, the green channel output, represented in FIG. 2b as $G_d$, is used as a reference band for image reconstruction subsystem 18 which, in the preferred embodiment, is a high definition (HD) video monitor.

Figure 5:
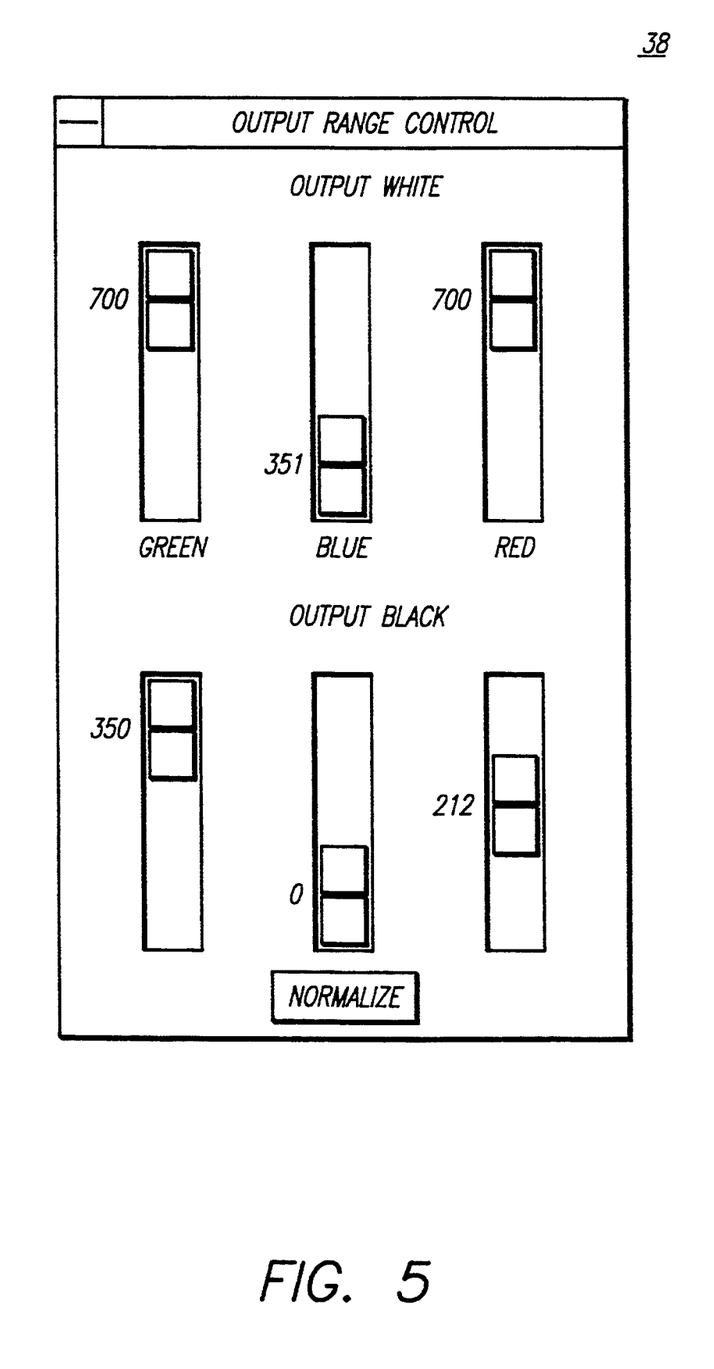
FIG. 5 is an illustration of an output range control interface of the present invention.

Referring to FIG. 5, an output range control interface 38 configured in accordance with the present invention is illustrated. As discussed above, the subject black and white levels of $R_{in}$, $G_{in}$ and $B_{in}$, upon input to color corrector 22, are specified from the input range control interface 36 shown in FIG. 3. In a preferred embodiment of the present invention, the subject white and black levels of $G_d$ are specified in output range control interface 38 to the subject white and black levels specified in $G_{in}$. For example, if the black level for $G_{in}$ was specified as 0.1 mV and the white level for $G_{in}$ was specified as 0.6 mV, then the output $G_d$ is specified, in output range control 35, to a black level of 0.1 mV and a white level of 0.6 mV. The black and white levels of $G_d$ establish the relationship between the output of characteristic curve processing subsystem 34 and the HD monitor video signal range. Specifying the white and black levels for $G_d$ allows the remaining monochromatic channels, $R_d$ and $B_d$, to be specified by the relative relationship of the subject black points on the log exposure axis of the remaining monochromatic channels to the subject black point on the log exposure of the chosen reference channel green. Although the present invention has been described in conjunction with green as the reference channel, one will appreciate that any monochromatic channel can be used as the reference channel.

As an alternative embodiment to using the green channel as the reference monochromatic channel, output range control 35 provides complete flexibility to specify the output subject image white and black levels for each monochromatic channel. A user can specify, through use of range control sliders on output range control 38, to output range control 35 an output subject image black and white levels for $G_d$, $R_d$ and $B_d$. Through use of output range control 38, complete flexibility is provided to an operator to specify white and black levels in each monochromatic channel for the HD monitor video signal range.

Figure 6:
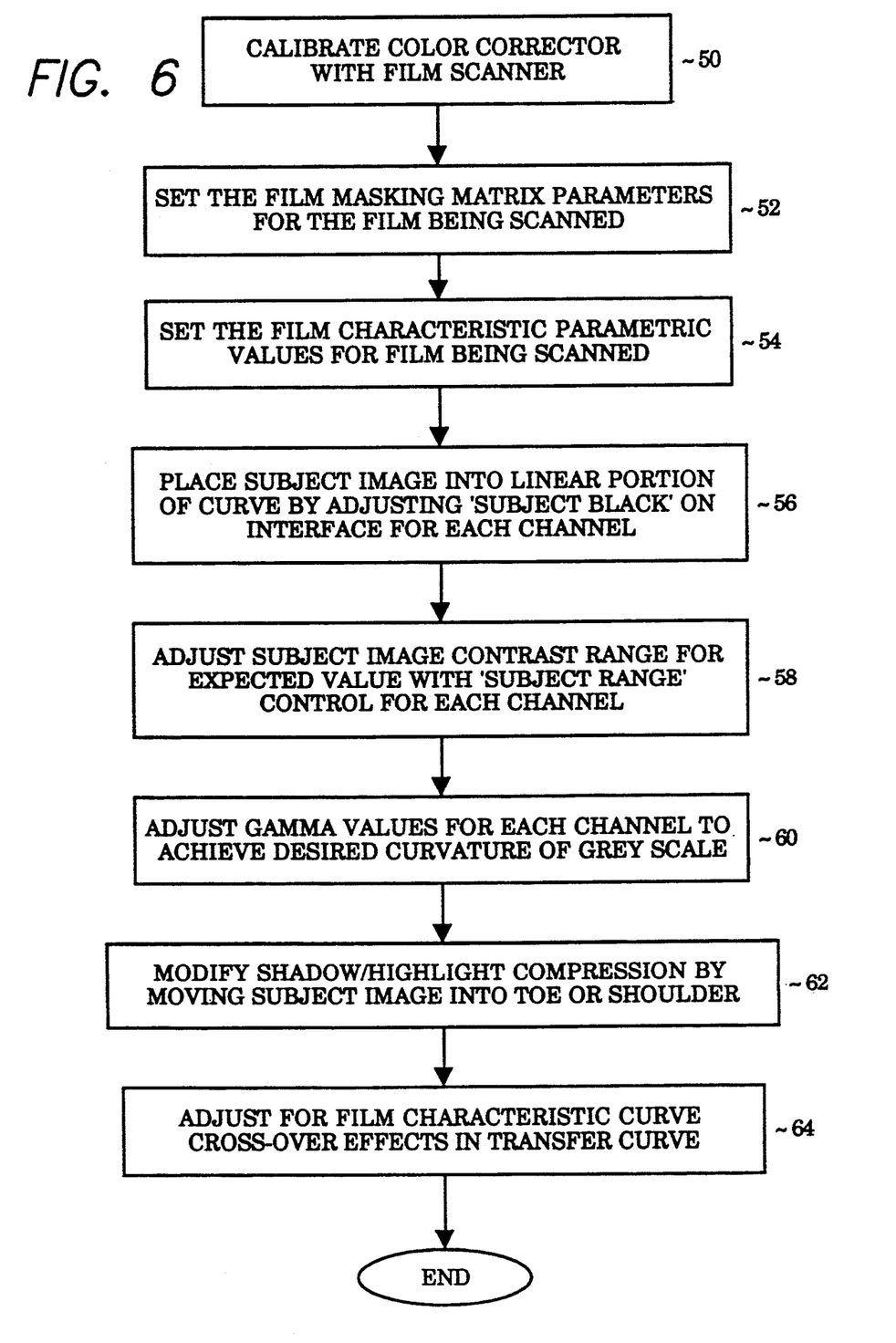
FIG. 6 is a flow diagram illustrating the method of gray scale balancing of the present invention.

The present invention has application for use in balancing a gray scale for a subject image. Referring to FIG. 6, a method for gray scale balancing incorporating the teachings of the present invention is illustrated. Upon completion of initial calibration, the film masking matrix parameters for the film being scanned, are loaded into film masking matrix processing subsystem 32. If the film masking matrix parameters are not known, then a default identity matrix can be used. In addition, the film characteristic curve parameters values suitable for the film being scanned for each monochromatic channel are loaded into the characteristic curve processing subsystem 34. If the film characteristic parameters are not known, then the default parametric values for either positive or negative film can be used. The user places the subject image into the linear portion of the characteristic curve for each channel with the use of the subject black control slider on the characteristic curve interface. Then the user adjusts the subject range slider on the characteristic curve interface so that the subject image contrast parameter corresponds with the subject image contrast known for the subject image. Also, the gamma values for each channel are adjusted. Both the subject range and the gamma adjustments are made so as to achieve an appropriate overall curvature of a gray scale. The black and the white points remain fixed at the levels specified during initial calibration.

At this point of the procedure, the gray scale output should be relatively linear and uniform in a central tone region corresponding to the linear portion of the characteristic curve. However, the shadow and highlight regions corresponding to the toe and shoulders regions of the characteristic curve respectively, may still be unequally compressed so that color effects are seen. In order to expand the shadow and highlight compression, the user moves the subject image onto the toe and the shoulder regions of the characteristic curve. The amount of expansion in the highlight and shadow regions is controlled by the toe and shoulder parameter sliders, and by the position of the subject image on the characteristic curve. The user compensates for the compression by stepping the subject image onto the shoulder and toe regions of the characteristic curve through use of the subject black slider. By adjusting the toe and shoulder sliders, the desired curvature indicated by the toe and shoulder parameters is obtained. In addition, film characteristic curve cross-over effects may be compensated for in a video domain transfer curve. For a detailed descriptions of the transfer curves see U.S. patent application Ser. No. 07/687,962, filed on Apr. 19, 1991, entitled Digital Color Correction System Having Gross and Fine Adjustment Modes.

Upon completion of the gray scale balancing, color fidelity can be adjusted. By manipulating the film masking matrix and/or the video cross talk matrix, the colors or hues and saturation in the image can be globally corrected. In addition, three transfer functions, one for each primary color channel, are provided to allow for local color perturbations. Local effects such as film characteristic cross-over are compensated for in the channel transfer curves as well as the introduction of artistic special effects that do not correspond to the original scene. For a detailed description of color manipulation utilizing the linear/video domain transfer functions see U.S. patent application Ser. No. 07/687,962, filed on Apr. 19, 1991, entitled Digital Color Correction System Having Gross and Fine Adjustment Modes.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for tracking a subject image recorded on a first medium and being electronically transferred to a second medium, said method comprising the steps of:

generating a plurality of monochromatic channels from said subject image recorded on said first medium wherein each of said monochromatic channels represents a complementary color such that said plurality of monochromatic channels comprise a polychromatic image of said subject image;

selecting a white level for said second medium by specifying a first input amplitude for each monochromatic channel such that said first input amplitude corresponds to a first tone on said second medium;

selecting a black level for said second medium by specifying a second input amplitude for each monochromatic channel such that said second input amplitude corresponds to a second tone on said second medium;

converting said subject image for each monochromatic channel into a logarithmic domain;

providing a Hurter-Driffield (HD) characteristic curve for each logarithmic converted monochromatic channel, said HD characteristic curve depicting density of said subject image on said first medium on a vertical axis and relative logarithmic exposure of said subject image recorded on said first medium on a horizontal axis;

specifying a dynamic range for said subject image for each monochromatic channel on said relative logarithmic exposure axis;

mapping said white and black levels onto said dynamic range specified on said relative logarithmic exposure axis;

correcting said subject image in each monochromatic channel in accordance with said HD characteristic curves based on said dynamic range specified, said white and black levels being tracked through correction with said HD characteristic curve;

exponentiating said subject image for each corrected monochromatic channel out of said logarithmic domain while tracking said white and black levels; and placing said subject image for each monochromatic channel into an output range compatible with said second medium in accordance with said white and black levels.

2. The method for tracking a subject image recorded on a first medium and being electronically transferred to a second medium as claimed in claim 1 wherein the step of specifying a dynamic range on said relative logarithm exposure axis comprises the steps of:

defining a subject black level on said relative logarithm exposure axis of said characteristic curve corresponding to a base exposure level that said subject image was recorded on said first medium; and defining a subject contrast on said characteristic curve, said subject contrast defining said dynamic range on said relative logarithm exposure axis of said characteristic curve corresponding to a subject contrast of said subject image as recorded on said first medium.

3. The method for tracking a subject image recorded on a first medium and being electronically transferred to a second medium as claimed in claim 1 wherein the steps of selecting said white and black levels further comprises the steps of:

providing a calibration interface comprising a black level slider and a white level slider for each of said monochromatic channels;

adjusting said white level slider so as to select said white level, said white level slider specifying said first input amplitude for each monochromatic channel;

adjusting said black level slider so as to select said black level, said black level slider specifying said second input amplitude for each monochromatic channel.

4. The method for tracking a subject image recorded on a first medium and being electronically transferred to a second medium as claimed in claim 2 wherein the steps of defining said subject black level and said subject contrast further comprises the step of providing a characteristic curve interface comprising a subject black and subject range controls for each monochromatic channel, said subject black and said subject range controls providing a means to place said subject image anywhere within said relative logarithm exposure axis of said HD characteristic curve.

5. The method for tracking a subject image recorded on a first medium and being electronically transferred to a second medium as claimed in claim 1 further comprising the step of providing film masking when said subject image is in said logarithmic domain, said film masking compensating in each monochromatic channel for crosstalk among polychromatic color emulsions contained within the first medium.

6. The method for tracking a subject image recorded on a first medium and being electronically transferred to a second medium as claimed in claim 1 wherein the step of placing each of said monochromatic channels into an output range compatible with said second medium comprises the steps of:

selecting a monochromatic channel as a reference channel from said plurality of monochromatic channels;

specifying an output white level for said reference channel equaling said white level for said reference channel at said first input amplitude selected;

specifying an output black level for said green channel equaling said black level for said green channel at said second input amplitude selected; and adjusting output white and black levels for each remaining monochromatic channels so as to allow said output white and black levels for said remaining monochromatic channels to be specified by a relative relationship of a subject black point on a log exposure axis of said remaining monochromatic channels to a subject black point on a log exposure axis of said reference channel.

7. The method for tracking a subject image recorded on a first medium and being electronically transferred to a second medium as claimed in claim 6 wherein selecting a monochromatic channel as a reference channel from said plurality of monochromatic channels comprises the step of selecting a green channel as said reference channel.

8. The method for tracking a subject image recorded on a first medium and being electronically transferred to a second medium as claimed in claim 1 further comprising the step of balancing a gray scale of said subject image for each monochromatic channel such that said gray scale is relatively linear and uniform in a central tone region corresponding to a linear portion of said HD characteristic curve.

9. The method for tracking a subject image recorded on a first medium and being electronically transferred to a second medium as claimed in claim 8 wherein the step of balancing a gray scale further comprises the step of adjusting gamma values for each monochromatic channel.

10. The method for tracking a subject image recorded on a first medium and being electronically transferred to a second medium as claimed in claim 8 wherein the step of balancing a gray scale further comprises the step of adjusting toe values for each monochromatic channel.

11. The method for tracking a subject image recorded on a first medium and being electronically transferred to a second medium as claimed in claim 10 wherein the step of adjusting toe values further comprises the step of stepping up said subject image on a toe portion of said HD characteristic curve.

12. The method for tracking a subject image recorded on a first medium and being electronically transferred to a second medium as claimed in claim 8 wherein the step of balancing a gray scale further comprises the step of adjusting shoulder values for each monochromatic channel.

13. The method for tracking a subject image recorded on a first medium and being electronically transferred to a second medium as claimed in claim 12 wherein the step of adjusting said shoulder values further comprises the step of placing said subject image on a shoulder portion of said characteristic curve.

14. The method for tracking a subject image recorded on a first medium and being electronically transferred to a second medium as claimed in claim 1 further comprising the steps of:
   providing a film masking matrix defining crosstalk among polychromatic color emulsions in each monochromatic channel within said first medium;
   providing video cross talk matrix defining electronic cross talk and non-linear responses within said subject image;
   manipulating said film masking matrix and said video cross talk matrix so as to globally correct said colors and saturations in said subject image.

15. The method for tracking a subject image recorded on a first medium and being electronically transferred to a second medium as claimed in claim 1 wherein said first medium comprises motion picture film.

16. The method for tracking a subject image recorded on a first medium and being electronically transferred to a second medium as claimed in claim 1 wherein said second medium comprises high definition video.

17. A method for tracking a subject image recorded on film and being electronically transferred to high definition video, said method comprising the steps of:
   generating a plurality of monochromatic channels from said subject image recorded on said film wherein each of said monochromatic channels represents a complementary color such that said plurality of monochromatic channels comprise a polychromatic image of said subject image;
   selecting a white level for said high definition video by specifying a first input amplitude for each monochromatic channel such that said first input amplitude corresponds to a first tone on said high definition video;
   selecting a black level for said high definition video by specifying a second input amplitude for each monochromatic channel such that said second input amplitude corresponds to a second tone on said high definition video;
   converting said subject image for each monochromatic channel into a logarithmic domain;
   providing a Hurter-Driffield (HD) characteristic curve for each logarithmic converted monochromatic channel, said HD characteristic curve depicting density of said subject image on said film on a vertical axis and relative logarithmic exposure of said subject image recorded on said film on a horizontal axis;
   specifying a dynamic range for said subject image for each monochromatic channel on said relative logarithmic exposure axis;
   mapping said white and black levels onto said dynamic range specified on said relative logarithmic exposure axis;
   defining a subject black level on said relative logarithmic exposure axis of said characteristic curve corresponding to a base exposure level that said subject image was recorded on said film;
   defining a subject contrast on said relative logarithm exposure axis of said characteristic curve, said subject contrast defining said dynamic range corresponding to a subject contrast of said subject image as recorded on said film;
   correcting said subject image in each monochromatic channel in accordance with said HD characteristic curve based on said dynamic range specified, said white and black levels being tracked through correction with said HD characteristic curve;
   exponentiating said subject image for each corrected monochromatic channel out of said logarithmic domain while tracking said white and black levels;
   balancing a gray scale of said subject image for each monochromatic channel such that said gray scale is relatively linear and uniform in a central tone region corresponding to a linear portion of said HD characteristic curve;
   selecting a green monochromatic channel as a reference channel from said plurality of monochromatic channels;
   specifying an output white level for said green channel equaling said white level for said green channel at said first input amplitude selected;
   specifying an output black level for said green channel equaling said black level for said green channel at said second input amplitude selected; and
   adjusting output white and black levels for each remaining monochromatic channels such that said remaining monochromatic channels float relative to said green monochromatic channel.

18. The method for tracking a subject image recorded on film and being electronically transferred to high definition video as claimed in claim 17 wherein the steps of selecting said white and black levels further comprises the steps of:
   providing a calibration interface comprising a black level slider and a white level slider for each of said monochromatic channels;
   adjusting said white level slider so as to select said white level, said white level slider specifying said first input amplitude for each monochromatic channel; and
   adjusting said black level slider so as to select said black level, said black level slider specifying said second input amplitude for each monochromatic channel.

19. The method for tracking a subject image recorded on film and being electronically transferred to high definition video as claimed in claim 17 wherein the steps of defining said subject black level and said subject contrast further comprises the step of providing a characteristic curve interface comprising a subject black and subject range controls for each monochromatic channel, said subject black and said subject range controls providing a means to place said subject image anywhere within said relative logarithm exposure axis of said HD characteristic curve.

20. The method for tracking a subject image recorded on film and being electronically transferred to high definition video as claimed in claim 17 further comprising the step of providing film masking when said subject image is in said logarithmic domain, said film masking compensating in each monochromatic channel for crosstalk among polychromatic color emulsions contained within the first medium.

21. The method for tracking a subject image recorded on film and being electronically transferred to high definition video as claimed in claim 17 wherein the step of balancing a gray scale further comprises the step of adjusting gamma values for each monochromatic channel.

22. The method for tracking a subject image recorded on film and being electronically transferred to high definition video as claimed in claim 17 wherein the step of balancing a gray scale further comprises the step of adjusting toe values for each monochromatic channel.

23. The method for tracking a subject image recorded on film and being electronically transferred to high definition video as claimed in claim 22 wherein the step of adjusting toe values further comprises the step of placing said subject image on a toe portion of said HD characteristic curve.

24. The method for tracking a subject image recorded on film and being electronically transferred to high definition video as claimed in claim 17 wherein the step of balancing a gray scale further comprises the step of adjusting shoulder values for each monochromatic channel.

25. The method for tracking a subject image recorded on film and being electronically transferred to high definition video as claimed in claim 24 wherein the step of adjusting said shoulder values further comprises the step of placing said subject image on a shoulder portion of said characteristic curve.

26. An apparatus for tracking a subject image recorded on a first medium and being electronically transferred to a second medium, said apparatus comprising:
  film scanner means for generating a plurality of monochromatic channels from said subject image recorded on said first medium wherein each of said monochromatic channels represents a complementary color such that said plurality of monochromatic channels comprise a polychromatic image of said subject image;
  calibration means coupled to said film scanner means for calibrating said subject image of each monochromatic channel, said calibration means accepting each monochromatic channel, said calibration means comprising;
  white level means for selecting a white level for said second medium by specifying a first input amplitude for each monochromatic channel such that said first input amplitude corresponds to a first tone on said second medium, and
  black level means for selecting a black level for said second medium by specifying a second input amplitude for each monochromatic channel such that said second input amplitude corresponds to a second tone on said second medium,
  logarithmic conversion means for converting said subject image for each calibrated monochromatic channel into a logarithmic domain;
  Hurter-Driffield (HD) characteristic curve means for generating a (HD) characteristic curve for each logarithmic converted monochromatic channel, said HD characteristic curve depicting density of said subject image on said first medium on a vertical axis and relative logarithmic exposure of said subject image recorded on said first medium on a horizontal axis;
  dynamic range means for specifying a dynamic range on said relative logarithmic exposure axis identifying said subject image for each monochromatic channel;
  mapping means for mapping said white and black levels onto said dynamic range specified on said relative logarithmic exposure axis;
  film correction means for correcting said subject image in each monochromatic channel in accordance with said HD characteristic curve based on said dynamic range specified, said white and black levels being tracked through correction with said HD characteristic curve;
  exponentiating conversion means for converting said subject image for each film corrected monochromatic channel out of said logarithmic domain while tracking said white and black levels; and
  output range means for placing said subject image for each monochromatic channel into an output range compatible with said second medium in accordance with said white and black levels.

27. The apparatus for tracking a subject image recorded on a first medium and being electronically transferred to a second medium as claimed in claim 26 wherein said dynamic range means comprises:
  subject black level means for defining a subject black level on said relative logarithm exposure axis of said HD characteristic curve corresponding to a base exposure level that said subject image was recorded on said first medium; and
  subject contrast means for defining a subject contrast on said characteristic curve, said subject contrast defining said dynamic range on said relative logarithm exposure axis of said HD characteristic curve corresponding to a subject contrast of said subject image as recorded on said first medium.

28. The apparatus for tracking a subject image recorded on a first medium and being electronically transferred to a second medium as claimed in claim 27 wherein said dynamic range means further comprises a characteristic curve interface comprising subject black and subject range controls for each monochromatic channel, said subject black and said subject range controls placing said subject image anywhere within said relative logarithm exposure axis of said HD characteristic curve.

29. The apparatus for tracking a subject image recorded on a first medium and being electronically transferred to a second medium as claimed in claim 26 wherein said calibration means further comprises calibration interface means comprising a black level slider and a white level slider for each of said monochromatic channels for specifying said white and black levels such that adjusting said white level slider for each monochromatic channel at said first input amplitude selects said white level, and adjusting said black level slider for each monochromatic channel at said second input amplitude selects said black level.

30. The apparatus for tracking a subject image recorded on a first medium and being electronically transferred to a second medium as claimed in claim 26 further comprising film masking means for compensating in each monochromatic channel for crosstalk among polychromatic color emulsions contained within the first medium when said subject image is in said logarithmic domain.

31. The apparatus for tracking a subject image recorded on a first medium and being electronically transferred to a second medium as claimed in claim 26 wherein said output range means further comprises a means for selecting a green monochromatic channel as a reference channel from said plurality of monochromatic channels, and specifying an output white level for said green channel equaling said white level for said green channel at said first input amplitude selected, said output range means specifies an output black level for said green channel equaling said black level for said green channel at said second input amplitude selected, and adjusts output white and black levels for each remaining monochromatic channels such that said remaining monochromatic channels float relative to said green monochromatic channel.

32. The apparatus for tracking a subject image recorded on a first medium and being electronically transferred to a second medium as claimed in claim 26 further comprising gray scale balancing means for balancing a gray scale of said subject image for each monochromatic channel such that said gray scale is relatively linear and uniform in a central tone region corresponding to a linear portion of said HD characteristic curve.

33. The apparatus for tracking a subject image recorded on a first medium and being electronically transferred to a second medium as claimed in claim 32 wherein said gray scale balancing means further includes means for adjusting gamma values for each monochromatic channel.

34. The apparatus for tracking a subject image recorded on a first medium and being electronically transferred to a second medium as claimed in claim 32 wherein said gray scale balancing means further includes means for adjusting toe values for each monochromatic channel.

35. The apparatus for tracking a subject image recorded on a first medium and being electronically transferred to a second medium as claimed in claim 32 wherein said gray scale balancing means further includes means for placing said subject image on a toe portion of said HD characteristic curve.

36. The apparatus for tracking a subject image recorded on a first medium and being electronically transferred to a second medium as claimed in claim 32 wherein said gray scale balancing means further includes means for adjusting shoulder values for each monochromatic channel.

37. The apparatus for tracking a subject image recorded on a first medium and being electronically transferred to a second medium as claimed in claim 36 wherein said gray scale balancing means places said subject image on a shoulder portion of said characteristic curve.

38. The apparatus for tracking a subject image recorded on a first medium and being electronically transferred to a second medium as claimed in claim 26 wherein said first medium comprises motion picture film.

39. The apparatus for tracking a subject image recorded on a first medium and being electronically transferred to a second medium as claimed in claim 26 wherein said second medium comprises high definition video.

* * * * *